(12) United States Patent
Hayball et al.

(10) Patent No.: US 6,385,196 B1
(45) Date of Patent: *May 7, 2002

(54) COMMUNICATION SYSTEM ARCHITECTURE AND A MANAGEMENT CONTROL AGENT AND OPERATING PROTOCOL THEREFOR

(75) Inventors: Clive Colin Hayball; Julian Frank Barry Cable; Stephen Rhylant Evans, all of Hertfordshire (GB)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,273

(22) Filed: Dec. 16, 1997

(51) Int. Cl.[7] ............................................... H04L 12/46
(52) U.S. Cl. ...................................... 370/356; 370/463
(58) Field of Search ................................ 370/254, 351, 370/356, 395, 401, 431, 462, 466, 468, 438, 463, 522

(56) References Cited

U.S. PATENT DOCUMENTS

| | | | |
|---|---|---|---|
| 5,678,006 A | | 10/1997 | Valizadeh et al. |
| 5,884,032 A | * | 3/1999 | Bateman et al. ............ 709/204 |
| 6,061,363 A | * | 5/2000 | Evans et al. ................. 370/467 |
| 6,069,947 A | * | 5/2000 | Evans et al. ................. 379/229 |
| 6,078,582 A | * | 6/2000 | Curry et al. ................. 370/356 |
| 6,078,583 A | * | 6/2000 | Takahara et al. ............ 370/356 |

FOREIGN PATENT DOCUMENTS

| | | |
|---|---|---|
| EP | 0 743 778 A2 | 11/1996 |
| GB | 2 323 249 A | 9/1998 |
| WO | 95/34974 | 12/1995 |

* cited by examiner

Primary Examiner—Min Jung
(74) Attorney, Agent, or Firm—Lee, Mann, Smith, McWilliams, Sweeney & Ohlson

(57) ABSTRACT

A communication network (300) comprises a call server (302) and several fabric control modules (322, 326, 330–334) coupled to the call server (302) through a fabric application interface (306, 324, 328, 342). The fabric control modules are arranged to control circuit connections (310, 312) within, for example, a narrowband-broadband interface (304) in response to the call server. A management agent (338) coupled to the call server through a dedicated management interface (336) includes a memory (340) for storing network configuration information and a processor (339) arranged to provide the network configuration information to the call server over the dedicated management interface (336) to affect initial establishment of the fabric application interface (306). In this way, the fabric application interface (306) is optimized in relation to available resources and consequently provides a uniform view between the call server and a narrowband-broadband interface (304).

43 Claims, 7 Drawing Sheets

COMMUNICATION SYSTEM ARCHITECTURE AND A MANAGEMENT CONTROL AGENT AND OPERATING PROTOCOL THEREFOR

RELATED PATENT APPLICATIONS

The present application is related to: i) co-pending U.S. patent application Ser. No. 08/907,521 filed on Aug. 8, 1997 in the name of J. F. B. Cable et al. and assigned to Northern Telecom Limited, which co-pending U.S. patent application is further identified by its title "SYSTEM AND METHOD FOR ESTABLISHING A COMMUNICATION CONNECTION"; and ii) co-pending UK patent application number 9720920.9 filed on Oct. 1, 1997 in the name Northern Telecom Limited, which co-pending UK patent application is further identified by its title "COMMUNICATION SYSTEM ARCHITECTURE AND OPERATING METHODS THEREOF" and the first named inventor R. H. Mauger.

BACKGROUND OF THE INVENTION

This invention relates, in general, to a communication system architecture having a management control agent and management control protocol therefor, and is particularly, but not exclusively, applicable to providing a communication interface between a narrowband network and a broadband network. More especially, the present invention creates a new management interface between a call server (that oversees system operation) and fabric control software that influences and controls operation of an asynchronous transmission mode system (termed an "ATMS").

SUMMARY OF THE PRIOR ART

Globally, telecommunication systems are, generally, in a transitional phase between second generation, narrowband digital networks (such as the Global System for Mobile (GSM) cellular communication system) and future, multimedia digital networks (such as the Universal Mobile Telecommunication System (UMTS)) having broadband capabilities. This transition is necessarily required to support higher data rate communications, including video and internet applications, presently being proposed and made available. Unfortunately, this transitional phase also presents system operators with several dilemmas, and prejudices immediate implementation of such broadband systems. For example, until such a time when a free-standing broadband system becomes an accepted and freely available standard for all subscriber terminals (such as cellular telephones and data transmission devices), system operators are reticent to write-off their significant investments in current narrowband infrastructure technology. Indeed, such narrowband infrastructure technology already provides a rich set of services and service creation environments that would have to be re-implemented for deployment in broadband networks. Consequently, present-day narrowband systems must be adapted to accommodate both narrowband and broadband. users; with this statement particularly relevant to service and system management, call establishment and inter-working procedures between these different forms of network.

For an effective migration between narrowband and broadband systems (for the transitional phase), system operators must particularly consider an inter-working scenario when all subscribers connect to a narrowband network, but one or more intermediate broadband networks are used to relay information between these narrowband subscribers. Any interim solution should also optimise service and system management, while also providing infrastructure equipment that can be re-used in a fully-fledged broadband environment.

In more detail, telecommunication networks comprise nodes connected by communication resources (usually termed "links"), with a particular network technology characterised by the means of transmission of user and control information along these links and also by the routing and relaying functions embodied in the nodes. The term routing is used to describe the process of determining the path the information will take through the network, while relaying is the process of transferring information from one link to another, i.e. the information is merely passed, without alteration, from one channel resource to another. Routing and relaying functions are therefore core to the development of an efficient system having optimised service capabilities, with operator profits and subscriber service charges inherently entwined with such optimisation.

Taking GSM as an exemplary form of a narrowband digital network, user and control information (or "data") is interleaved, using time division multiplexing (TDM), on a 64 kbit per second (kbps) pulse code modulated (PCM) bearer channel. Indeed, these bearer channels can each be framed to support four voice calls of 16 kbps, comprised from 13 kbps of sampled and encoded speech and 3 kbits of ancillary information, such as parity check and correction bits (and the like) and synchronisation information. Data is then relayed across a node by some form of synchronous TDM switching fabric, often of the 'time-space-time' type. Control information (e.g. call set-up and tear-down messages) logically follows the same path (although not always the same physical path) through the network as user information, and is terminated in each node for routing purposes. Routing is conventionally performed, in each node, on a 'hop-by-hop' basis using long lived routing tables, i.e. the node is sufficiently intelligent to determine an optimum route for the succeeding network connection.

Control information is regulated by a signalling scheme that is distinctive to the type of network employed. Particularly, public signalling systems are used between nodes of a public network and between public networks of different operators. Signalling System No. 7 is the only important example of a public signalling system. Access signalling systems are used between subscribers and edge nodes of public networks, e.g. between a radiotelephone and a base station subsystem (BSS). In fact, the most common digital access signalling schemes are Common Channel Signalling Systems, such as the Integrated Service Digital Network (ISDN) DSS1 signalling schemes (and its predecessors) and Channel Associated Signalling schemes that are both derived from analog signalling. Private schemes are generally derived from access schemes but provide richer functionality within personal networks, such as within a secure private branch exchange (PBX).

On the other hand, broadband digital networks are characterised in that user and control information is transmitted in fixed or variable length "packets" or "cells", with these packets prepended with headers that contain bearer channel identification. In contrast with narrowband systems, user information is relayed across a node via an asynchronous switching fabric that examines each packet in turn (using some kind of fairness algorithm) and directs it to the appropriate output link in response to the input link and bearer channel identification. Routing and control information transmission is, however, similar to that for the narrowband case, and differs only inasmuch as the signalling schemes are technology specific.

Another significant problem associated with prior art narrowband-broadband interfaces arises with architectural change. For example, the introduction of new or up-graded infrastructure can have unwanted ramifications throughout the entire communication system because changes in the inter-working relationships between the network controller (e.g. a call server) and the narrowband-broadband interface can potentially alter network identities and addresses. More particularly, the configuration of the narrowband-broadband interface may change (as a result of either the inclusion of additional equipment, the up-grading of existing equipment, or the failure of a particular system entity), while the call server remains oblivious to this change because of the uniform fabric application interface between the call server and the fabric control software. Consequently, the system (generally) may not necessarily be exploited and optimised to its greatest potential. Network providers may therefore also be discouraged from implementing the further development of existing networks since global system changes may be required, with such system changes being both time consuming and complex in nature.

To facilitate use of broadband networks and the migration of communication networks to high data rate technologies (e.g. the 2 Mbps rate envisaged within UMTS), there is a need to provide an effective mechanism for interconnecting narrowband networks through a transparent broadband ether, while also providing an easy migration to more advanced systems. Indeed, the broadband ether must accommodate and support narrowband signalling schemes Without affecting either data integrity or in any way inhibiting data flow or interconnection. Furthermore, to encourage subscription to broadband services, operators must provide a reliable but relatively low-cost (and hence optimised) communication system architecture.

SUMMARY OF THE INVENTION

According to a first aspect of the present invention there is provided a communication network comprising: a call server for administering control of connections in the communication network; a plurality of fabric control modules coupled to the call server through a fabric application interface, the fabric control modules arranged to control circuit connections within the communication network in response to the call server; and a management agent coupled to the call server through a dedicated management interface, the management agent including a memory for storing network configuration information, the management agent further having means arranged to provide the network configuration information to the call server over the dedicated management interface to affect establishment of the fabric application interface.

In a second aspect of the present invention there is provided a method of establishing a fabric application interface between a call server arranged to administer control of connections in a communication system and a plurality of fabric control modules coupled to the call server through the fabric application interface, the fabric control modules arranged to control circuit connections within the communication system in response to the call server, the communication system further having a management agent coupled to the call server through a dedicated management interface and wherein the management agent includes a memory, the method comprising the steps of: storing system configuration information in the memory of the management agent; sending the system configuration information to the call server over the dedicated management interface; and establishing the fabric application interface between the call server and the plurality of fabric control modules based upon receipt of the system configuration information by the call server.

In a preferred embodiment, the fabric application interface can be altered by the steps of: having the management agent notify the call server, over the dedicated management interface, of a system change that effects at least one fabric control module; and having the call server alter the fabric application interface based on the system changes notified by the management agent. In this respect, the management agent may either independently interrogate the fabric control modules or may react to a request (preferably based on Q.2931-type signalling protocol) from the call server.

In another aspect of the present invention there is provided a method of altering a fabric control interface between a call server arranged to administer control of connections in a communication network and a plurality of fabric control modules coupled to the call server through the fabric application interface, the fabric control modules arranged to control circuit connections within the communication network in response to the call server, the communication network further having a management agent coupled to the call server through a dedicated management interface, the method comprising the steps of: having the management agent notify the call server, over the dedicated management interface, of a system change that effects at least one fabric control module; and having the call server alter the fabric application interface based on the system changes notified by the management agent.

In a further aspect of the present invention there is provided a management agent for a communication system comprising a call server arranged to administer control of connections in a communication system and a plurality of fabric control modules coupled to the call server through a fabric application interface, the fabric control modules arranged to control circuit connections within the communication system in response to the call server, the management agent containing: a memory that contains system configuration information critical to the establishment of the fabric application interface between the call server and the plurality of fabric control modules; and a processor coupled to the memory and arranged to send the system configuration information to the call server over a dedicated management interface to cause establishment of the fabric application interface.

Again, in a preferred embodiment, the processor is arranged to interrogate at least some of the plurality of fabric control modules to determine an operation status thereof and wherein the processor is further arranged to notify the call server, over the dedicated management interface, of a change in operational status that effects at least one fabric control module to instigate alteration of the fabric application interface in response to and based on the change.

In yet another aspect of the present invention there is provided a method of interrogating communication system entities operationally responsive to a call server arranged to administer control of connections in a communication network, the call server and at least some of the communication system entities coupled to a management agent arranged to interrogate the at least some of the communication system entities, the method comprising the step of: sending a status request message to the management agent from the call server; in response to receiving the status request message, having the management agent interrogate at least one of the at least some of the communication system entities to determine an operational status thereof; and having the management agent communicate the operational status to the call server.

Advantageously, the present invention provides a communication system architecture that has a uniform interface between a system controller and a narrowband-broadband interface, which interface can be adapted in-call to reflect system changes and faults that arise in relation to particular circuits or services provided by equipment ancillary to the narrowband-broadband network. Indeed, the present invention allows the communication network to be evolved quickly by virtue of the fact that changes to system configuration (and operation) need only initially be notified to the management agent, with the management agent able to advise the call server (at an opportune time) of alterations required in the fabric application interface.

BRIEF DESCRIPTION OF THE DRAWINGS

An exemplary embodiment of the present invention will now be described with reference to the accompanying drawings, in which.

DETAILED DESCRIPTION OF A PREFERRED EMBODIMENT

There are, apparently, two principal ways of implementing the interconnection of narrowband subscribers units through an intermediate broadband network, such as an asynchronous transmission mode (ATM) architecture; either an inter-working function can be implemented at each boundary between the narrowband and broadband networks (in which a dedicated and reversible coding transposition is applied to the respective narrowband-broadband information), or narrowband information can be encapsulated over a broadband subnet whereby the narrowband information is packaged with a broadband frame structure (so entirely maintaining the integrity and format of the original encoded narrowband information). In relation to user information, e.g. encoded speech or specific data traffic, it has been identified that both the inter-working function and encapsulation mechanisms are possible and merely represent an additional process step that complicates and extends the requirements for coding within communication systems, generally. However, in relation to control information (which is required to establish and maintain a connection), there are a number of penalties and benefits associated with both of the above approaches. Specifically, encapsulation allows existing services to be supported, even though these services may not independently be sustained by the broadband network. Furthermore, encapsulation is simple to implement. On the other hand, inter-working requires only a local view at each inter-working point (i.e. at the narrowband-broadband boundary), and also provides a mechanism that can support the participation of narrowband and broadband subscribers in a single call.

Figure 1:
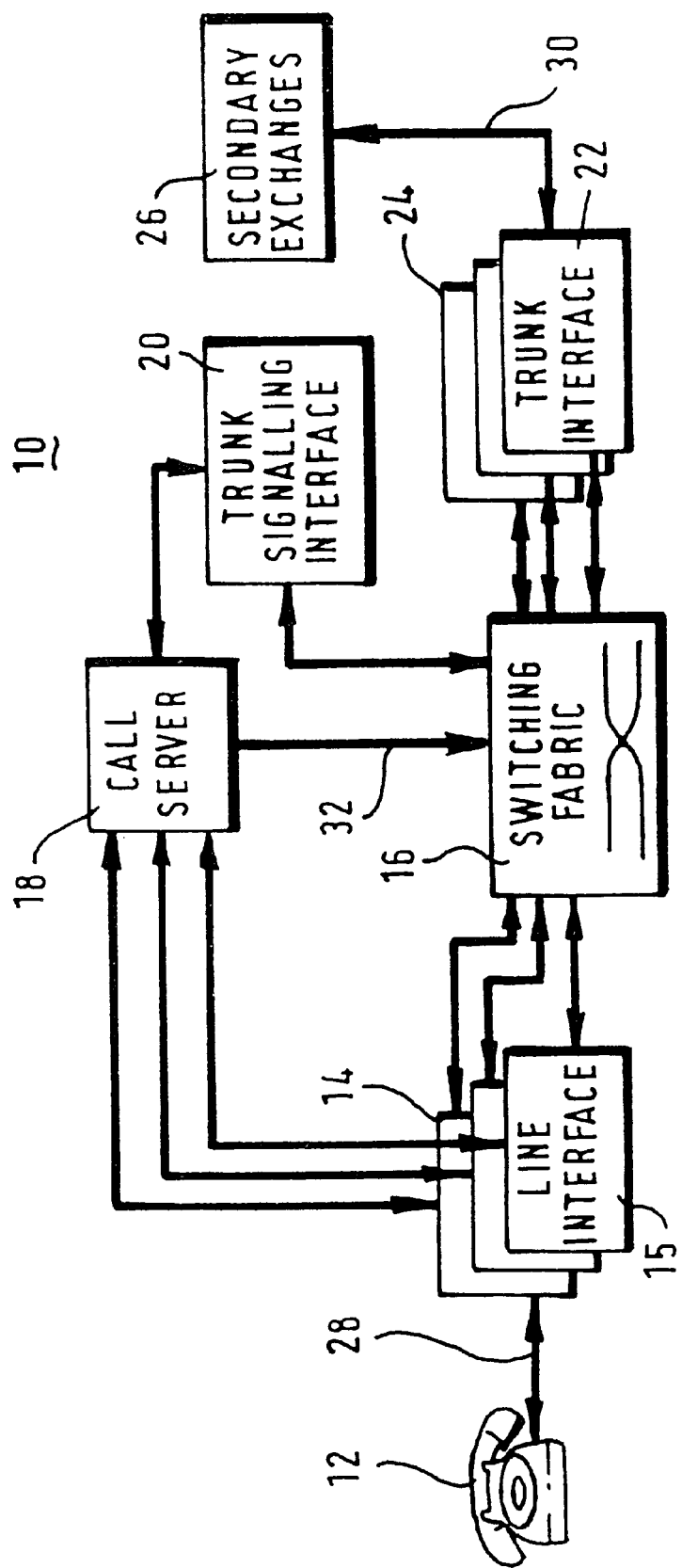
FIG. 1 is a block diagram illustrating an abstract model of a narrowband communication node.

Referring to FIG. 1, a block diagram illustrating an abstract model of a narrowband communication node 10 is shown. A number of subscriber terminals 12, such as landline telephones or modems, are coupled, typically, to a plurality of line interfaces 14–15 (although only one need be supplied for an operational system). The plurality of line interfaces 14–15 are each connected to a switching fabric 16 that is arranged to route an input of the switching fabric 16 to an appropriate output thereof, as will readily be appreciated. The plurality of line interfaces 14–15 are also coupled (usually on an individual basis) to a call server 18 arranged to administer and control, for example, the set-up and tear-down of calls across the narrowband network 10. The call server 18 is further coupled to the switching fabric 16. A trunk signalling interface 20, that acts to decode and interpret signalling schemes used within the narrowband network 10, is coupled between the call server 18 and the switching fabric 16. Outputs from the switching fabric 16 are coupled to a plurality of trunk interfaces 22–24 (although only one need be supplied for an operational system). The plurality of trunk interfaces are further coupled to secondary exchanges 26, such as PBXs or BSSs, within the narrowband network 10.

As will be appreciated, the term "subscriber terminal" is used merely to describe a particular endpoint connection for a line or trunk interface.

User information (traffic) 28–30 enters the narrowband infrastructure via line interfaces 14–15 or trunk interfaces 22–24. Control information from individual subscribers enters via the line interfaces 14–15, whereas control information, i.e. inter-node signalling, from connected trunked networks (e.g. the secondary exchanges 26) can enter either via the same trunks as the traffic 30 or through the use of dedicated channel resources (not shown). The call server 18 processes incoming call requests and selects an appropriate outgoing trunk or line, as will readily be appreciated. More particularly, the call server 18 (through the switching fabric 16) controls the connection of specific lines to specific trunks across through the use of fabric control messages 32 that specify the making and breaking of connections between subscriber terminals 12.

While most calls in narrowband systems are two-way, it is helpful to introduce, at this time, the nomenclature associated with one-way connections, namely the connection (TA, TB) refers to the one-way connection from terminal TA to terminal TB while (TB, TA) refers to a complementary (or independent supported) connection in the reverse direction.

Figure 2:
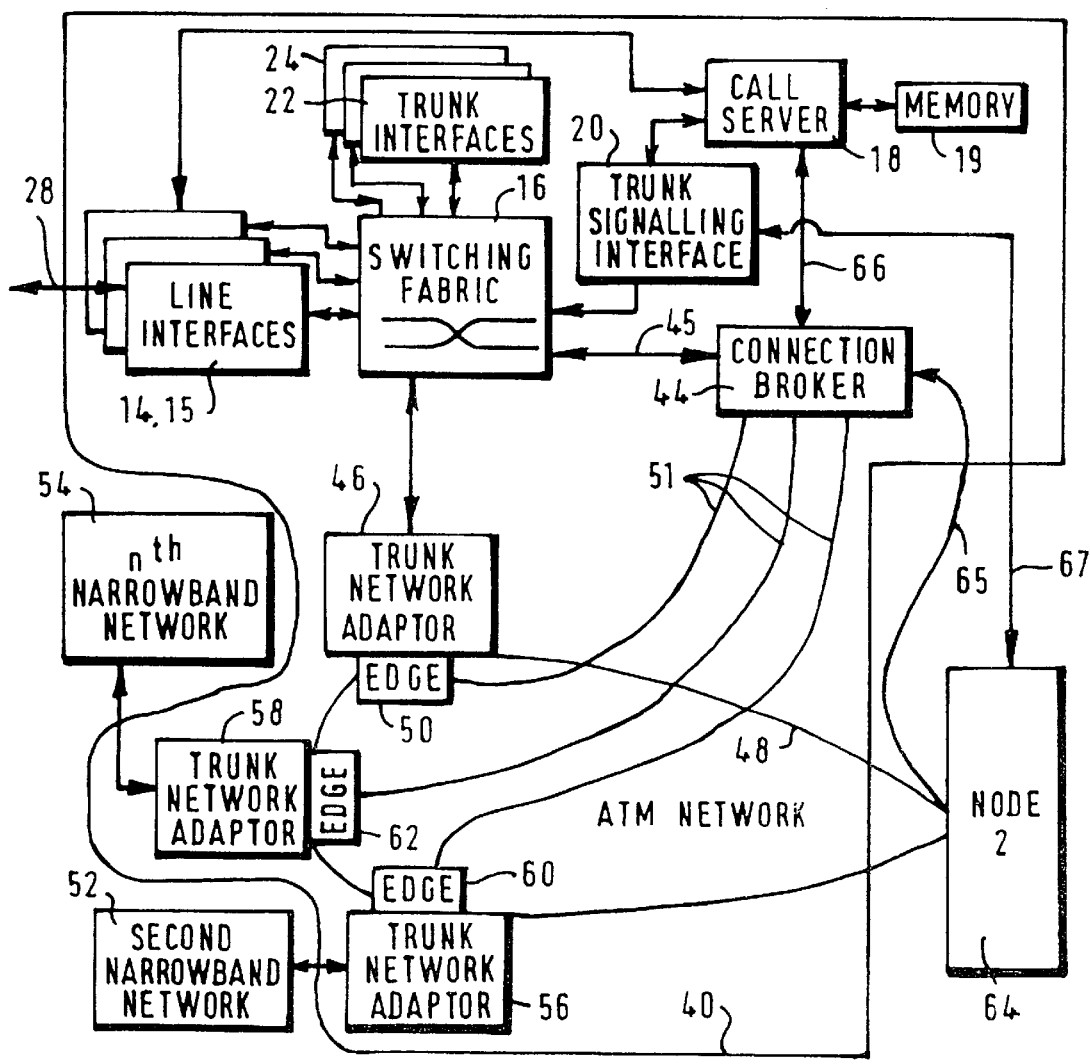
FIG. 2 is a block diagram illustrating an underlying principle for subscriber terminal interconnection between narrowband and broadband networks, as required in the present invention.

Turning now to FIG. 2, there is shown a block diagram illustrating an underlying principle for subscriber terminal interconnection between narrowband and broadband networks, as required in the present invention. In this figure, a broadband network is used to transport the user and/or control information. To facilitate an understanding of the architectural differences between the conventional narrowband network of FIG. 1 and the broadband network adjunct that interconnects narrowband networks, common infrastructure is labelled with identical reference numerals.

At a first node 40, a number of subscriber terminals, such as landline telephones or modems (not shown for the sake of clarity), are coupled, typically, to a plurality of line interfaces 14–15 (although only one need be supplied for an operational system) of a narrowband system. The plurality of line interfaces 14–15 are each connected to a switching fabric 16 that is arranged to route an input of the switching fabric 16 to an appropriate output thereof. The plurality of line interfaces 14–15 are also coupled (usually on an individual basis) to a call server 18 arranged to administer and control, for example, the set-up and tear-down of calls across the narrowband network.

The call server is coupled to a memory that is arranged to store, amongst other things, circuit indicators codes (CICs) associated with both real trunks and "phantom trunks"; the purpose of the latter will be described subsequently. More particularly, the memory can record a "busy" or "vacant" status against each of these real or phantom trunks. The call server 18 is further coupled to a connection broker 44, which in turn is coupled to the switching fabric 18 via bus 45. The connection broker 44 represents a first departure in the system architecture of the present invention from the conventional narrowband network FIG. 1. A trunk signalling interface 20, arranged to act to decode and interpret signalling schemes used within the narrowband network, is coupled between the call server 18 and the switching fabric 16. Outputs from the switching fabric 16 are coupled to a plurality of trunk interfaces 22–24, (although only one need be supplied for an operational system. The plurality of trunk interfaces are again coupled to secondary exchanges (not shown for the sake of clarity), such as PBXs or BSSs, within the narrowband network.

The switching fabric 16 is further coupled to a first trunk network adaptor 46 that allows interconnection and interoperability of the narrowband network with a broadband network 48 implemented, for example, for asynchronous transmission mode (ATM) operation. More particularly, interconnection of the trunk network adaptor 46 is through a broadband network edge switch 50, that is coupled to and hence controlled by the connection broker 44 by control lines (or buses) 51. The combined function of the trunk network adaptor 46 and the broadband network edge switch 50 will be described subsequently. Other narrowband networks 52–54 are coupled, in a similar fashion, to the broadband network 48 via respective trunk network adaptors 58–60 and broadband network edge switches 60–62. As will be appreciated, other narrowband networks 52–54 will be realised through infrastructure architectures similar to that described immediately above.

The broadband network 48 is further coupled to a second node 64, typically a different network, which is also responsive to the connection broker 44 via connection (or control line or control bus) 65. The second node 64 is also arranged to be in communication with the trunk signalling interface 20 via communications bus 67. Additionally, as will be understood, the broadband network may support point-to-point broadband communications, such as video telephony between subscriber terminals (not shown).

As will be appreciated, the terms node and exchange are interchangeable and are used to describe stand-alone networks, e.g. distinct narrowband networks operated by different operators.

Narrowband signalling within the communication system, generally, is controlled by the call server 18, while broadband signalling, i.e. signalling that may be sent between different narrowband networks 52–54 via the intermediate broadband network 48, is controlled by the connection broker 44. Consequently, the call server 18 is not concerned with broadband signalling interconnection and operation.

The narrowband line interfaces 14–15, trunk interfaces 22–24 and switching fabric 16 are supplemented by a broadband network 48 and trunk (i.e. narrowband-broadband) network adaptors 46, 56–58 that act to provide gateway functionality. Specifically, the trunk network adaptors 46, 56–58 perform traffic (user information) interworking functions and signalling (control information) encapsulation, with the signalling ultimately relayed back to a call server 18.

The function performed by the connection broker 44 is used to provide a uniform connection abstraction 66 for the call server 18, independent of whether the connection crosses (and is retained entirely within) the narrowband network or the broadband network, or in the case where the connection crosses both the narrowband and broadband networks. This necessitates use of a uniform terminal name space identity (i.e. a standardised address format) for all terminals across the entire communication system, i.e. both narrowband and broadband systems.

For a narrowband to narrowband connection in a single narrowband network (e.g. owned by a particular operator), the connection broker 44 passes the connection messages to the switching fabric 16 (via connection 45), and therefore acts transparently in order to appear identical in function to the prior art narrowband network of FIG. 1. The switching fabric 16 of the narrowband network then establishes the connection in accordance with known techniques, and does not utilise the broadband network 48. For a broadband to broadband connection, the connection broker 44 instructs the broadband network and/or trunk network adaptors 46, 56–58 to make or break a call connection, and therefore mimics standard broadband operation.

For a narrowband to broadband connection, however, both actions must be performed contemporaneously. Specifically, the connection broker 44 both instructs the switching fabric 16, through the call server 18 in the narrowband network, to hold open a routing path for a call and negotiates with a trunk network adaptor 46 of the broadband network for the allocation of a suitable channel resource. Once both paths have been determined, the connection broker 44 sends dedicated messages to the switching fabric 16 and the trunk network adaptor 46 to establish the connection. This achieves the connection abstraction as seen by the call server.

In an operational communication system, compatibility between operators is desirable, if not essential. As such, establishing an interconnection (usually termed a "gateway"), between different "mixed nodes" is a significant issue. In this context, the term "mixed nodes" is used to describe different networks, operated by different operators, each typically having switchable narrowband-broadband capabilities and defined service capabilities. However, intermediate broadband networks may not be able to support these services (or any service of similar nature) nor be to interpret narrowband control channel signalling required to set-up a defined narrowband services, i.e. there are different signalling protocols between the different adjacent exchanges. In this case, the interconnection of the narrowband networks (through the intermediate broadband network 48) requires the functional coordination of separate call servers and connection brokers located in the respective networks.

Figure 3:
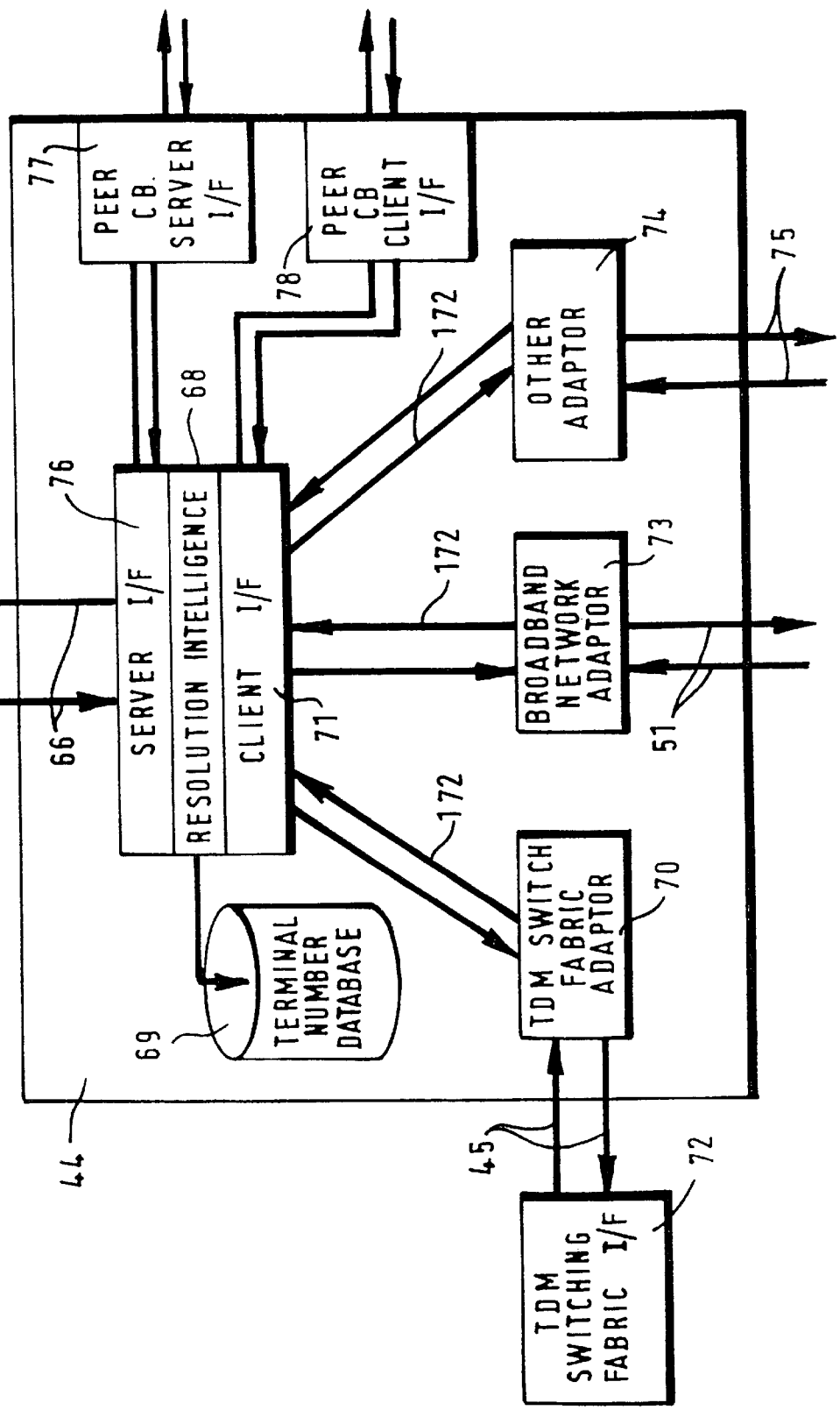
FIG. 3 illustrates an abstract architecture for a connection broker of FIG. 2.

Turning to FIG. 3, an abstract architecture for the connection broker 44 of FIG. 2 is shown. Although a hardware implementation is dependent upon (and hence determined by) specific requirements, a typical implementation extends the capabilities of an existing, narrowband telephone exchange. By way of example and explanation only, the connection broker 44 of FIG. 3 contains resolution intelligence 68 that is typically realised by a control processor. The function of the resolution intelligence 68 will be described subsequently. A terminal number data base 69 that maps the uniform terminal numbers onto network-specific location addresses is coupled to the resolution intelligence 68. A time division multiplexed (TDM) switch fabric adaptor 70 (in the case of a TDM narrowband system) provides protocol conversion between the resolution intelligence 68 (via a client orientated interface port 71) and a TDM switching fabric interface 72 (analogous to the switching fabric 16 of FIG. 2). Typically, a dedicated connection protocol 172 is utilised between the resolution intelligence 68 and the TDM switching fabric adaptor 70, although this need not be the case. A broadband network adaptor 73 is also coupled through the client interface port 71 to the resolution intelligence 68, with communication between the resolution intelligence 68 and broadband network adaptor 73 typically based on the dedicated connection protocol 172. The broadband network adaptor is analogous to the trunk network adaptor 46 of FIG. 2. Other adaptors 74 for ancillary networks or services may also be coupled to the resolution intelligence 68 via the client interface 71. The broadband network adaptor 73 and the other adaptors 74 will accordingly be respectively coupled to the broadband network edge switch 50 via control lines 51 or appropriate communication resources 75. The resolution intelligence is also coupled to a server interface port 76 that provides an interconnection facility, via lines 66, to call server 18. The server interface port is also coupled through a secondary port 77 (termed a "peer connection broker server interface") arranged to interconnect the resolution intelligence 68 of the connection broker 44 to another connection broker (shown in FIG. 4). Similarly, the client interface port 71 is also coupled to a ternary port 78 (termed a "peer connection broker client interface") arranged to couple the resolution intelligence 68 of the connection broker 44 to a subscriber terminal principally connected to another connection broker (as shown in FIG. 4).

Prior art telephone exchanges typically have a distributed processing architecture with multiple fault-tolerant processors and an inter-processor communications facility, while the switching fabric may be supported by a special purpose processor, as will be understood.

The connection broker 44 of FIG. 3 supports a set of real-time processes within a single fault tolerant processor, i.e. within the resolution intelligence 68. The inter-processor communications facility (supported by the dedicated connection protocols 172) of the connection broker is used to communicate with the switching fabric 16 and the call server 18. As has been previously described, the connection broker 44 typically incorporates broadband interfaces to enable control of the broadband network, although the connection broker may use the inter-processor communications facility to access the broadband interfaces on the trunk network adaptors. However, as communication networks evolve to be more broadband-orientated, the call server 18 and connection broker 44 may reside on processors with only broadband interfaces that are connected directly to the broadband network 48. The narrowband connection fabric would then be provided with a broadband control interface.

Figure 4:
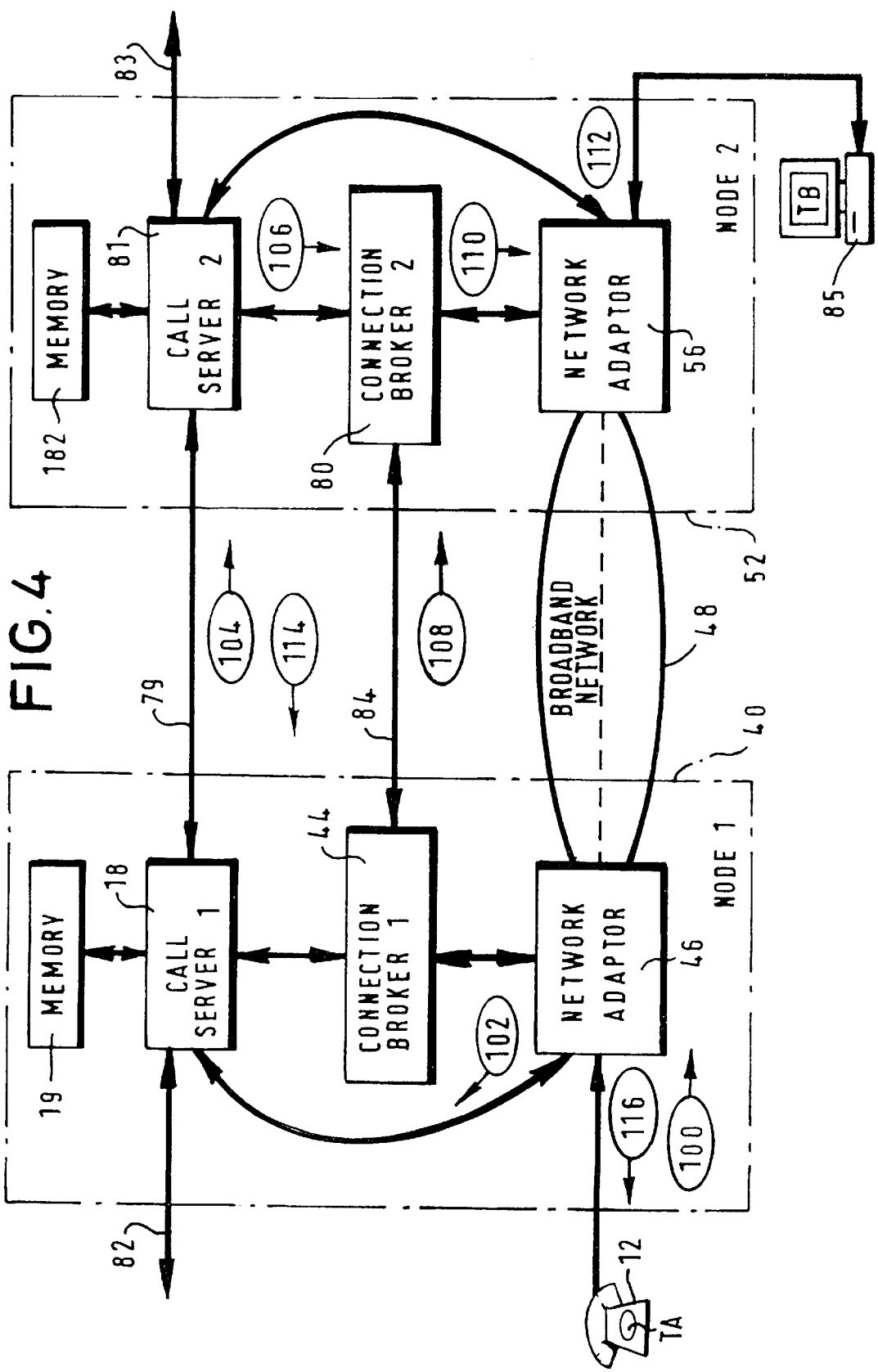
FIG. 4 is a representation of a system architecture and associated mechanism by which subscriber terminals can be connected across an intermediate broadband network.

A system architecture and associated mechanism for connecting subscriber terminals across an intermediate broadband network is shown in FIG. 4. In order for a data call, for example, to be supported between terminal TA (e.g. a land line telephone identified by reference numeral 12) on a first node 40 and terminal TB (e.g. a modem within a computer, identified by reference numeral 85) on second node 52, an existing common signalling relation between both narrowband nodes is utilised. It is the establishment of a common narrowband signalling link (or resource) 79 and protocol that provides interconnection across the system since the broadband network need only have the capability of relaying traffic between the narrowband networks. The broadband network consequently appears as a transparent channel resource since no modification of the narrowband traffic is required.

The first node 40 and the second node 52 both contain trunk network adaptors 46 and 56, connection brokers 44 and 80, and call servers 18 and 81 which are coupled permanently together over the common narrowband signalling link 79 that provides a plurality of virtual (or "phantom") traffic trunks. The call servers 18 and 81 are therefore potentially connected to other call servers (not shown) of different narrowband networks (not shown) by additional signalling resources 82–83. The call servers 18 and 81 are respectively coupled to connection brokers 44 and 80 that in turn are coupled to respective trunk network adaptors 46 and 56. The trunk network adaptors 46 and 56 are coupled together through a broadband network 48, while the connection brokers 44 and 80 are interconnected by a virtual link 84. Terminal TA 12 is coupled to trunk network adaptor 46, while terminal TB 85 is coupled to trunk network adaptor 56.

The signalling link 79 is realised a permanent connection between the two call servers 18 and 81, although this connection may be dynamically assigned or provided by a radio frequency link. Indeed, in a scenario where the first node 40 and second node 52 pre-exist as narrowband gateway nodes between network A and network B, real narrowband E1 trunks already exist between these two exchanges and, as such, signalling can be carried in a time-slot of these E1 trunks, i.e. conventionally in time-slot sixteen. Alternatively, in a North American-based system, the two different exchanges could be connected to a common STP network. Once the broadband network 48 is in place, however, supplementary signalling bandwidth can be supported by establishing links through the broadband network. Nonetheless, these multiple paths represent a single logical "signalling relation" by which SS7 user parts (i.e. the call servers) are able to communicate and interact.

The virtual link 84 established between the two connection brokers 44 and 80 offers a permanent "ability to communicate". The virtual link 84 therefore takes the form of an ATM virtual channel connection. However, it is also possible for an SS7 network to be used as the bearer for this communication, e.g. in relation to a TCAP application. The communication links between the connection brokers 44 and 80 and both the network adaptors 46, 56 and the switching fabrics are also permanent, while connections that carry traffic between the network adaptors 46, 56 and the interconnected subscriber terminals TA 12, 85 are made and broken for the duration of a specific call or for particular portions of those calls.

This system operates by virtue of the provision of at least two (and probably tens to thousands of) assignable signalling channel resources or "phantom trunks" between the respective switching fabrics, principally residing between the respective call servers 18 and 81 and respective connection brokers 44 and 80. The nodes then utilise narrowband signalling to simulate the presence of virtual (or "phantom") terminals at either node. These phantom trunks are dedicated to a single node and, as such, the system only allows the formation of a call in one direction from the first node 40 to the second node 52 or vice versa. Thus, a phantom route between the two nodes consists of two groups of phantom trunks, one in each direction. By this mechanism, undesirable effects which could otherwise occur if the same phantom trunk was seized by each node trunk are prevented. Beneficially, the phantom trunks do not tie up real communication resources that exist between the respective narrowband networks.

Figure 5:
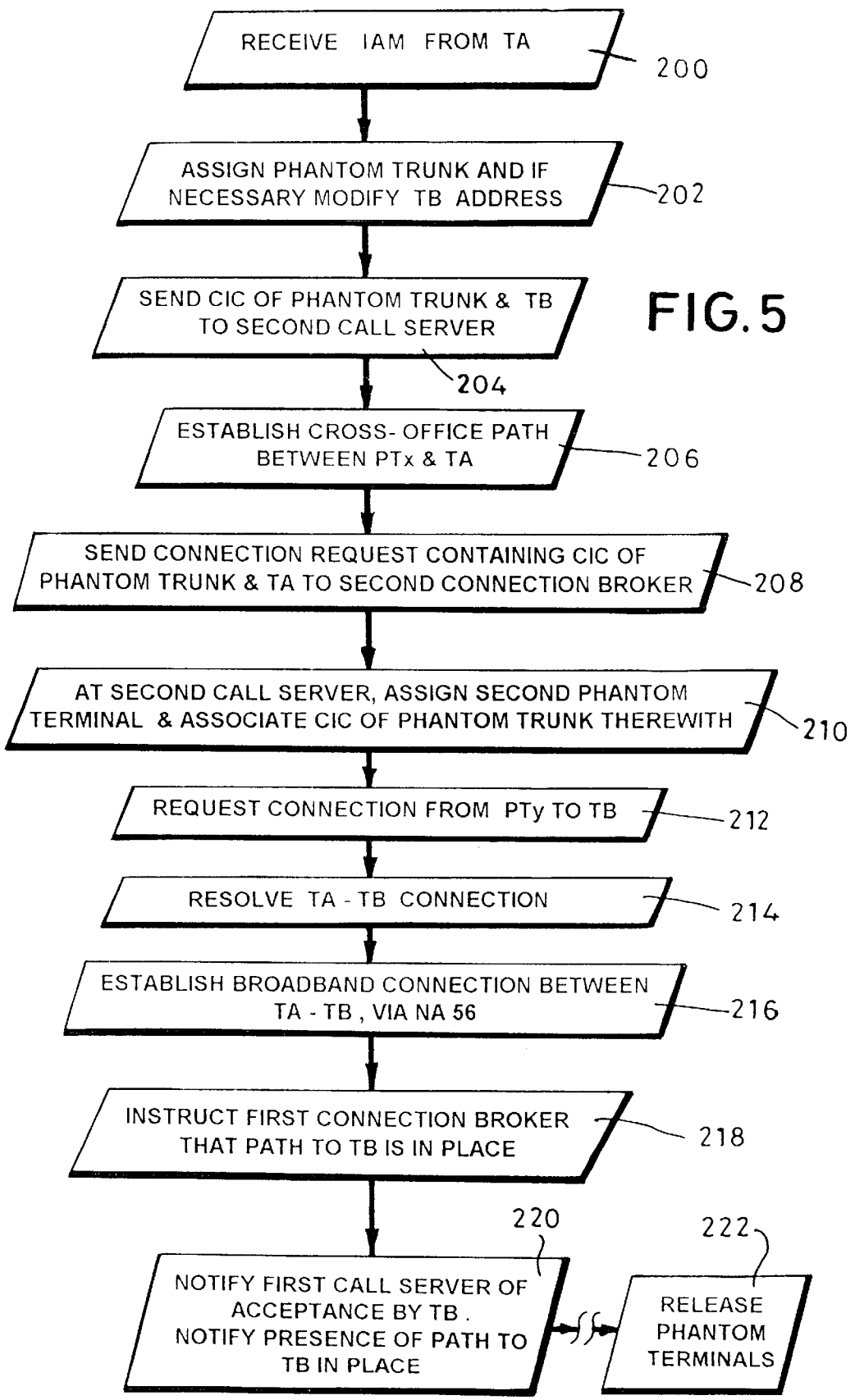
FIG. 5 is a flow diagram illustrating the procedural steps required in the present invention to establish a multi-node communication across a broadband network.

In relation to the structure, content and function of call set-up messages between different exchanges (i.e. different nodes), this can best be understood with reference to FIG. 4 and the flow diagram of FIG. 5 that illustrates the procedural steps required to establish a multi-node communication across a broadband network.

An incoming call (or "initial address message", IAM) from terminal TA is received 200 at the first node 40, whose call server 18 receives the incoming message and determines that the call must be routed to the second node 52. The incoming call will at least contain a CIC relating to the trunk assigned between TA and the call server 18 together with a telephone number of the called party, namely TB in this example. The telephone number does not otherwise provide any indication of a port address to be used by TB in any subsequent communication and therefore principally acts to provide a routing instruction for use by the call servers. As such, the telephone number merely represents an address location of TB, although it may need to be subsequently transposed in order to arrive at a valid cross-node address.

In response to receipt of the incoming call and to save real communication resources (i.e. real communication links that can support 64 kbps speech, for example), the first call server 18 selects a free phantom terminal PTx and then uses this phantom terminal to establish 202 a phantom trunk between itself and a second call server 81 located in second node 52. Indeed, the call server 18 selects an available, node-unique ("disjoint") address field indicative of the free phantom terminal PTx from its associated memory 19. The free phantom terminal PTx, in fact, identifies a terminating address of the phantom trunk.

Typically, a phantom terminal identity is comprised from point codes associated with the two call servers 18, 81 and the CIC of the phantom trunk. In this instance, ordering of the point codes of the two call servers will identify a relative direction for the communication.

The first call server 18 then utilises the phantom trunk to relay 204 a modified call message (to the second call server 81 of the second node 52) comprised from a CIC associated with the phantom trunk together with the valid telephone number of TB. The second call server 81 is therefore able to utilise the telephone number of TB to "wake-up" or alert TB to the fact that there is something in the communication system that will be of interest to TB, albeit that TB is yet to receive any meaningful information. Unfortunately, at this time, the CIC pertaining to the connection between TA and the first call server 18 has been "lost" to the second node 52 since it is neither communicated nor encoded within the modified call message. In other words, the call server 18 of the first node 40 notifies the call server 81 of the second node 52 about the incoming call 100 by sending 104 a modified incoming call message on a phantom trunk, and thus passes on the dialled digits (i.e. the address of the called party) received from TA.

Furthermore, in response to the incoming call 100, the connection broker 44 of the first node 40 is arranged to establish 206 a phantom cross-office path between PTx and TA, with information pertaining to this cross-office path typically stored in the terminal number data base 69 by the resolution intelligence 68. In other words, terminal TA is coupled to phantom terminal PTx. Also, the first connection broker 44 is triggered into action by the communication of the modified call message (to the second call server 81). Specifically, substantially contemporaneously with the sending of the modified call message, the first connection broker 44 of the first node 40 notes that the phantom terminal PTx is one end of an outgoing phantom trunk to the second node 52. The first connection broker therefore passes 208 a connection request 106 to the second connection broker 80 via virtual link 84, which connection request contains the CIC of the phantom trunk and the identity of TA (possibly derived from the original CIC assigned to the trunk between TA and the first call server 18). Typically, the actual address of the call-originating unit, i.e. TA, is sent.

The second node 52 reacts to the modified incoming call message (received on the phantom trunk) by mapping 210 the received circuit indicator code (CIC) of the phantom trunk onto an associated second phantom terminal PTy. Again, the second phantom terminal PTy has been selected by the second call server 81 of the second node 52 from its associated memory 182, with the memory up-dated to record that PTy represents a terminating point of the phantom trunk. Selection of the phantom terminal PTy is on a unique basis.

The second node 52, in response to the second call server 81 receiving the modified incoming call message, already appreciates that the destination of the incoming call ultimately lies with terminal TB. Therefore, at an appropriate time, the second call server 81 requests 212 a connection from TB to the second phantom terminal PTy (in the form of a second phantom cross-office path request between the phantom trunk and the called subscriber TB), and offers the incoming call request to TB using conventional signalling.

Furthermore, the resolution intelligence of the second connection broker 80, in response to receiving (in any order) both requests resolves out 214 the two phantom terminals PTx and PTy, converting the two requests "Connect TA to PTx" and "Connect TB to PTy" into the single real connection request "Connect TA to TB". Specifically, the second connection broker 80 is able to deduce the fact that there is a common CIC for the phantom trunk, and so the requirement for a direct connection between TA and TB is identified by virtue of this commonality. The second connection broker 80 then makes an actual trunk connection 216 between TA and TB via the second trunk network adaptor 56. At about the same time, the second connection broker 80 (of the second node 52) instructs 218 the first connection broker 44 (of the first node 40) that the path to TB is in place.

Acceptance by the terminal TB of the call, and confirmation of the connection by the second-call broker 80 is notified from the second call server 81 to the first call server 18, and the first connection broker 44 also notifies 116 its associated call server 18 that the path to TB is in place. At this point 220, the first call server 18 may start billing the call.

The phantom trunk remains intact for the whole duration of the call, with tear-down of the broadband connection operating in a complementary sense to the call set-up procedure describes in detail above. The skilled addressee will appreciate that to clear-down a broadband call, the call servers may clear a call using standard procedures for a narrowband (or SS-7) communication, as will readily be appreciated. Particularly, as part of this procedure, both call servers will issue requests to their respective connection brokers. Thereafter, the connection broker at the outgoing end of the phantom trunk will pass its release request onto the other connection broker by sending the CIC of the phantom trunk. The terminating connection broker will issue a clear-down of the broadband connection on receipt of whichever of the two messages it receives first. It is noted that the phantom trunk is not re-useable until both call servers have been told (by their respective connection brokers) that the broadband connection has cleared.

As will be understood, an exemplary address format for each phantom terminal is typically arranged to be a special case of the format used for real (i.e. physical rather than imaginary) terminals. An ASN.1 Object Identifier can be used to identify phantom trunks. Alternatively, a partitioned E.164 address or a superset of E.164 may be utilised, while for a simple SS7-based implementation the tuple (OPC, DPC, CIC) can uniquely identify a trunk (whether real or phantom). However, as will be appreciated, another scheme is needed for non-SS7 terminals, such as telephones. For example, the CIC field could be extended to 32 bits (rather than the normal 16 bits) and DPC can then be equated to OPC to identify a "line" type of a terminal while the CIC can be used to identify the line on the exchange. Generally, however, the only requirement for-establishing a phantom trunk is for the connection broker to appropriately tag and record (in the terminal number data base 69) such a phantom trunk as either incoming or outgoing.

Turning again to the general architecture of FIG. 2, an ATM network and the International Telecommunications Union, Telecommunications Section (ITU-T) signalling system No. 7 an be utilised to implement the broadband network and narrowband control signalling, respectively.

Particularly, a narrowband node utilises the ISDN User Part (ISUP) of ITU-T signalling system no. 7 to communicate with other exchanges (e.g. narrowband network 52) to support multi-node operation. The exchange terminates some narrowband lines directly and terminates narrowband trunks via trunk network adaptor 46 connected to an Asynchronous Transfer Mode (ATM) network 48. The trunk network adaptor 46 translates bearer channels to an ATM scheme, with a one-to-one relationship existing between each bearer channel and an ATM virtual channel (VC). Typically, the broadband network edge switches 50, 60–62 and hence the trunk network adaptors 46, 56–58 are connected to the ATM network 48 using ATM Forum User to Network Interface (UNI) version 4.0 interfaces for the traffic bearer channels and the control lines 51, while the connection brokers establish Q.2931 connections 51 to trunk network adaptors 46, 56–58 using the proxy signalling option of UNI 4.0.

Narrowband signalling to other exchanges can use either existing narrowband connections or can be routed via network adaptors (e.g. 46, 58) and the broadband network using either circuit emulation or frame forwarding. The concept is applicable to both fully and quasi-associated signalling schemes. Connections to another mixed mode node are implemented in a similar fashion.

As will now be understood, the connection broker 44 passes narrowband-to-narrowband requests to the narrowband switching fabric 16, while broadband-to-broadband connections (within the same node) are established using proxy signalling to set-up the connection directly. For narrowband-to-broadband connections, two requests are needed; one to the narrowband switching fabric 16 and one to the broadband network edge switches 50, 60–62. However, for a broadband-to-phantom terminal connection, the connection broker passes the connection request to the second connection broker (reference numeral 70 of FIG. 3) at the other end of the phantom route. The connection is then made by using a proxy signalling scheme emanating from the second connection broker 70. It should be noted that the present invention envisages that the phantom terminals are implemented as broadband terminals, and so a narrowband-to-phantom terminal connection is handled as a combination of a narrowband-to-broadband connection and a broadband-to-phantom terminal connection.

It will also be appreciated that the service inter-working function is also applicable to networks that have intermediately coupled broadband networks. In this instance, the interconnection between call servers can provide gateway functions, such as billing and screening, while the connection brokers permit end-to-end connections between the narrowband terminals. Similarly, signalling inter-working functions not otherwise available to respective narrowband networks can be provided by connecting call servers together via the phantom trunks.

In summary, the second connection broker recognises two connection requests have been received to the opposite ends of the same phantom trunk, and in response thereto establishes a direct route through the broadband network between the first subscriber terminal 12 and the second subscriber terminal 68.

The connection mechanism outlined above therefore provides for the interconnection of mixed nodes through an intermediate broadband network which is otherwise unable to interpret and therefore unable to support the control channel signalling protocols separately utilised within the narrowband networks. Such operation could be supported, for example, by a modified trunk network adaptor (of a broadband network) equipped with narrowband signalling software, but generally occurs between different infrastructure exchanges. Consequently, by employing this mechanism to establish a common control channel, the modified trunk network adaptor can support a narrowband traffic resource to participate in narrowband services without requiring the intervention of a signalling inter-working function.

Beneficially, the combination of phantom trunks and the connection broker architecture results in a system implementation that requires no modifications to present narrowband signalling schemes and which supports all narrowband services. Additionally, only minimal changes are required to existing narrowband call servers. Indeed, this system is scaleable to arbitrarily complex networks and which can operate over any underlying connection fabric including TDM, ATM or Frame Relay.

While the use of phantom trunks is an extremely effective and inventive mechanism for establishing a connection between narrowband trunks and virtual circuits of a broadband network in the face of dissimilar signalling schemes, the mechanism is limited in so much as the underlying mode of operation of the call server necessarily requires detailed prior knowledge of the underlying architecture within an ATMS, especially in relation to operational capabilities and numbers of individual components within the fabric control software.

The present invention provides an architecture and mechanism that has an enhanced opportunity for system development but which ensures that an interface between a call server (responsible for overall control of system management and signalling for a particular network) and a narrowband-broadband interface (such as an ATMS) supports a simple and uniform view between the call server and the narrowband-broadband interface.

Figure 6:
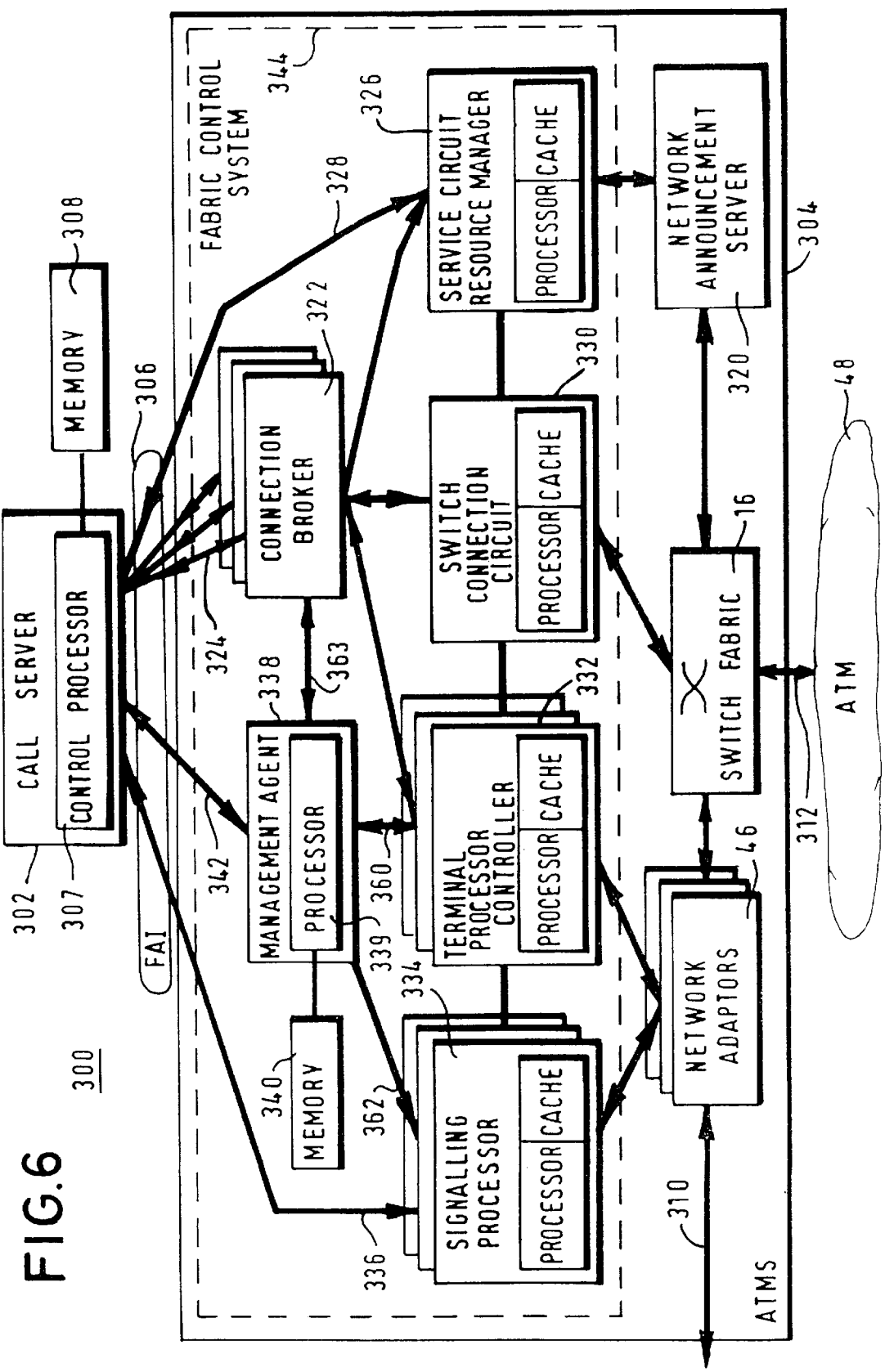
FIG. 6 shows a block diagram of a communication system architecture of a preferred embodiment of the present invention.

Considering in detail the block diagram of the novel system architecture of the preferred embodiment of the present invention of FIG. 6, a call server 302 controls the operation of a narrowband-broadband interface (ATMS) 304 through a fabric application interface (FAI) 306. The call server 302 contains a control processor 307 that interacts with a memory 308 that serves to store system control algorithms, network addresses and information relating to communication connections and the operational status of the network, generally. The memory 308, although shown as a separate entity from the call server, may be located within the call server itself.

As will be appreciated, the ATMS 304 provides an interface for connecting narrowband trunks, typically supporting a time division multiplexed protocol (although other forms of multiplexing are also applicable), to virtual circuits 312 used to relay information across a broadband network 48 (such as an ATM network). With respect to the ATMS 304, narrowband trunks 210 are coupled to network adaptors 316, with the ATMS 304 both supporting many narrowband trunks 310 and containing many network adaptors 46. A switch fabric 16 acts to connect network adaptors 46 (and hence information or data incident to narrowband trunks) to virtual circuits 312. The switch fabric 16 is further coupled to a network announcement server 320 that typically stores a plurality of pre-recorded system announcements that provide verbal instructions or verbal reassurance to narrowband or broadband users attempting to utilise the narrowband-broadband interface. For example, the network announcement server 320 may store and relate the message "All connection in the network are presently busy, please try again later" when no virtual circuits are available for connection into the ATMS 314, or no trunk circuits 310 are available for through-connection to the narrowband network.

The ATMS 304 typically includes many connection brokers 322 that are connected to the call server 302 through the fabric application interface 306, although the ATMS must contain at least one connection broker for successful operation. More specifically, interconnection of the call server 302 to the connection brokers 322 is achieved through a fabric control interface (FCI) 324 that can support and relay, amongst other things, virtual channel identities and system control messages. In more detail, the connection broker 322 is responsible both for overseeing interactions between the ATMS 304 and the call server 302 concerning connections through the ATMS 304 and for coordinating other fabric control modules to implement and satisfy call server instructions and requests. In other words, the call server 302, as previously indicated, is principally responsible for controlling the making and breaking of connections across the narrowband-broadband interface.

Fabric control modules that connect to the connection broker 322 include a service circuit resource manager 326 that is responsible for managing a pool of network announcement servers 320 that may need to be connected to traffic connections across the ATMS, as previously described. The service circuit resource manager 326 is also coupled through the fabric application interface 306 to the call server 302, which connection to the call server is through a dedicated announcement control interface (ACI) 328.

A switch connection circuit 330, coupled between the connection broker 322 and the switch fabric 16, is responsible for coupling and detaching virtual circuits 312 that terminate on the switch fabric 16. In other words, the switch connection circuit 330 controls through connection (i.e. circuit switching) of virtual circuits 312 to identified network adaptors 46.

Terminal process controllers 332 (of which there are usually many within the ATMS 304) are positioned and connected between the connection broker 322 and the plurality of network adaptors 46 within the ATMS 304. Each terminal process controller 332 is responsible for managing the operation of synchronous circuits terminating on a network adaptor 46 in traffic connections across the ATMS, and hence serves an analogous purpose to the switch connection circuit 330 but in relation to narrowband trunks (rather than virtual circuits). The terminal processing controllers 332 are also coupled to signalling processors 334 (of which there are typically many within the ATMS 304), while the signalling processors 334 are also coupled to the network adaptors 46. Each signalling processor is coupled to the call server 302 through a signalling control interface (SCI) 336 that forms part of the fabric application interface 306. The function of each signalling processor 334 is to control the conversion of signalling information between FAI messages exchanged over the SCI 336 between the call server 302 and the framed structures and signalling formats used by the synchronous circuits that terminate on each network adaptor 46. In other words, each signalling processor acts to convert information bits at a network adaptor level to and from messages at a call server level. In this way, a unified view is provided by a fabric application interface 306 by virtue of the use of standard signalling schemes on the FCI 324, the ACI 328 and the SCI 336.

The system of the preferred embodiment of the present invention also includes a new management agent 338 having a control processor 339 and associated memory 340. The associated memory 340, although shown external to the management agent 338, may be located within the management agent 338. The management agent is also coupled to the call server 302 through the fabric application interface (FAI) 306. Specifically, a dedicated management virtual channel circuit (VCC) 342 provides interconnection of the call server 302 to the management agent 338, with the management VCC 342 also forming part of the fabric application interface 306. The management agent 338 is also coupled to each of the terminal process controllers 332 and each of the signalling processors through information buses 360–362, while the management agent 338 is also able to communicate (over another information bus 363) with the connection broker 322.

The connection broker 322, the service circuit resource manager 326, the switch connection circuit 330, the terminal process controllers 332, the signalling processors 334 and the management agent 338 (and its associated processor 339 and memory 340) together contain and constitute a distributed fabric control system (FCS) 344. The FCS 344 therefore also contains software programme blocks that control the functionality of the ATMS 304 and its interconnection to the call server 302 through the FAI 306. The signalling processors 334, the terminal process controllers 332, the switch connection circuit 330 and the service circuit resource manager 326 will therefore each typically require dedicated processors and memory (perhaps realised as an on-chip memory cache, as shown in FIG. 6). The processors will control operation of the individual instances, and may be accessed (or interrogated) by the management agent 338 to access operational status, for example.

The fabric control system 344 can have a distributed functionality, with the fabric control system 344 comprising five principal functional modules and a management agent 338. It will, however, be appreciated that the distributed functionality provided by the functional modules may be co-located since the functionality is typically realised by controlled software located within system controllers or processors.

It will be understood that dedicated information buses may also be provided between the management agent and both the switch connection circuit 330 and the service resource circuit resource manager 326, notwithstanding that the management agent 338 is able to communicate with (and interrogate) these units through the connection broker 322. Additionally, such information buses may only be required for a distributed system in which the fabric control system 344 is realised by discrete functional units.

In relation to the management agent 338, this represents an additional and supplemental management interface between the call server 302 and the fabric control system 344, which management agent 338 and its associated management VCC 342 serves to enhance the FAI 306 by establishing contextual information for the ACI 328, FCI 324 and the SCI 336. The management agent 338 also serves to advise and relay information relating to the interchange of non call-related status information, e.g. the operational status of trunk circuits.

With regard to the management VCC 342, this virtual circuit is well known to the call server 302 and the management agent 338. Indeed, both the call server 302 and the management agent 338 have knowledge of the existence and the virtual channel identity number of the management VCC in advance of the narrowband-broadband interface going on-line. As such, the call server is always able to communicate with the management agent 338, with both the management agent 338 and the call server always being aware of the existence of the other unit.

The associated memory 340 of the management agent 338 is principally loaded (and can be up-dated) with system (or network) configuration information pertaining to the types of interfaces used in the fabric application interface 306, the addresses of virtual circuits used for these interfaces and the number and type of fabric control models used within the fabric control system 344. Moreover, the associated memory 340 contains information concerning the number of connection broker instances, for example, as well as the numbers of signalling processors 334. Generally, therefore, in the preferred embodiment of the present invention, the call server 302 is unaware of the internal details (i.e. the structure) of the fabric control system 344. The call server 302 only knows that it has access to a number of pre-defined interfaces provided as a uniform view presented by the fabric application interface 306.

During a preferred operating routine of the present invention (and particularly during initialisation of the system or the bringing on-line of an up-graded ATMS 304 in which additional fabric control models or trunk adaptors have been added), the processor 339 of the management agent 338 accesses the associated memory 340 to retrieve and then relay system configuration information (e.g. the number and type of particular instances coupled through the FAI 306 to the call server 302) to the call server 302 over the management VCC 336. Once in receipt of the system configuration information, the call server 302 can function to administer and control, set-up, tear-down and system management of the ATMS, generally, over the FAI 306. In other words, the management agent 338 controls the set-up of the fabric application interface 306 within a particular ATMS 304 by providing detailed system configuration information to the call server, namely port address information, virtual circuit information, and the types and numbers of functional modules within the FCS 344. Indeed, in the event that the fabric control system 344 is altered, details of the changes in the system can be entered into the memory 340 and then the management agent can notify the call server of the availability of, for example, new fabric control modules. In this way, only a single management device (i.e. the management agent 338) is effected by a modification of the fabric control system 344, and the management agent can therefore affect a change in the FAI 306 by sending system configuration information to the call server via the management VCC 336.

The operating mechanism of the preferred embodiment of the present invention as such ensures that each FAI 306 presents a unified view to a call server, albeit that an FAI of a particular ATMS is unique (since it is dependent upon assigned port addresses and particular configuration of functional modules in the FCS 344). As will now be appreciated, the unified view across the FAI 306 is achieved because the call server sets up the FAI and is therefore able to utilise a standardised signalling protocol to address precisely (and generally communicate with) each clearly identified functional module in the FCS 344.

In greater detail, the memory 340 of the management agent 338 stores contextual information pertaining to interfaces that constitute the FAI 306, i.e. information relating to the ACI 328, the FCI 324 and the SCI 336. Moreover, the management agent 338 also ensures that the call server 302 and the fabric control system 344 have a shared knowledge of virtual channel identities used for communication with each functional module instance, e.g. in relation to the address of each connection broker. The management agent 338 also ensures that the call server is aware of the number and type of instances in the FCS 344, e.g. the number of connection brokers that are available to it at any one time. In this respect, the present invention uses a dedicated virtual channel circuit (namely the management VCC between the management agent 338 and the call server 302) and a modified and extended sub-set of Q.2931 signalling primitives for the purpose of conveying non callrelated management information over the FAI 306 between the call server 302 and the ATMS 304.

After establishment of the configuration of the FAI 306 through notification of available instances and addresses, the call server 302 can request status information on the management VCC 342. The fabric control system 344 is then able to respond to this request (through the management agent 338) on the management VCC. Alternatively, the management agent 338 can provide autonomous event information to the call server 302 over the management VCC 342 (notwithstanding that the connection broker can also provide information to the call server, e.g. by identifying a new VCC). For example, the management agent 338 can utilise the management VCC 342 to notify the call server of significant operational changes with respect to: i) an operational status of a particular connection broker or signalling processor; ii) the operational status of lower-tier equipment, e.g. in relation to circuits within the service circuit resource manager (reported via the connection broker); or iii) the number, present use or availability of trunk circuits. In all these respects, the preferred embodiment of the present invention uses a Q.2931-based signalling scheme to support this data transfer, with the principal messages of relevance being "STATUS ENQUIRY", "STATUS" and "NOTIFY" primitives. Clearly, other signalling protocols could also be used across the FAI 324, with the selection merely dependent upon the operational requirements of the call server (as will be appreciated by the skilled addressee).

In relation to a STATUS ENQUIRY, this form of enquiry can be instigated from either end of the management VCC 342. More particularly, a STATUS ENQUIRY solicits an absolute response through a STATUS response message, with the STAUS ENQUIRY message containing, in this context, a modified frame structure. Whereas a STATUS ENQUIRY would usually contain a call reference field, this call reference is superfluous to a request concerning system configuration and, as such, the field can be used, for example, to identify particular network or ATMS elements of interest or a response type. Similarly, the STATUS response message does not need to contain a call reference field, and so this unused field can, in the context of the present invention, be used for a different purpose, e.g. to provide response information and cause of failure information. In other words, the STATUS ENQUIRY expressly identifies the circuit of functional element of interest, while the STATUS response message provides a report by using data fields that have no meaning in relation to system configuration and system operation. With regard to the NOTIFY primitive of the Q.2931 protocol, NOTIFY is an unsolicited message that usually includes a call reference and a notification indicator of length five bytes. Again, in the context of system-wide reports on configuration and operational status, call reference fields can be temporarily commandeered (or appropriated) to report system changes or addresses, while the format of the notification indicator can be structured to identify, for example, cause of failure.

Generally, as will now be understood, the connection broker can react to status enquiries issued by the call server provided that its signalling protocol can support call server interaction and interrogation. In fact, all functional blocks within the FCS 344 can report system events to the call server, but such reports are limited to the scope of responsibility of each functional block, e.g. the status of a single circuit. However, the management agent 338 has the capability to support all management operations of the FCS 344, and therefore is able to report on the functional status of the individual functional blocks themselves. Use of the management agent 338 for all such system reports is considered preferable, although this mechanism is slower because it required a STATUS ENQUIRY, for example, to be relayed through the management agent rather than directly to the functional block of interest. The management agent 338 therefore generally responds to requests and system status, but can also be used as a vehicle for issuing a change in an individual circuit, e.g. the call server instructs the management agent to issue a command to network adaptor, for example.

The management agent may store system information pertaining to system configuration in its associated memory 340, which information may trigger periodic polling of a failed system entity, e.g. a broken connection broker or a broken trunk.

Figure 7:
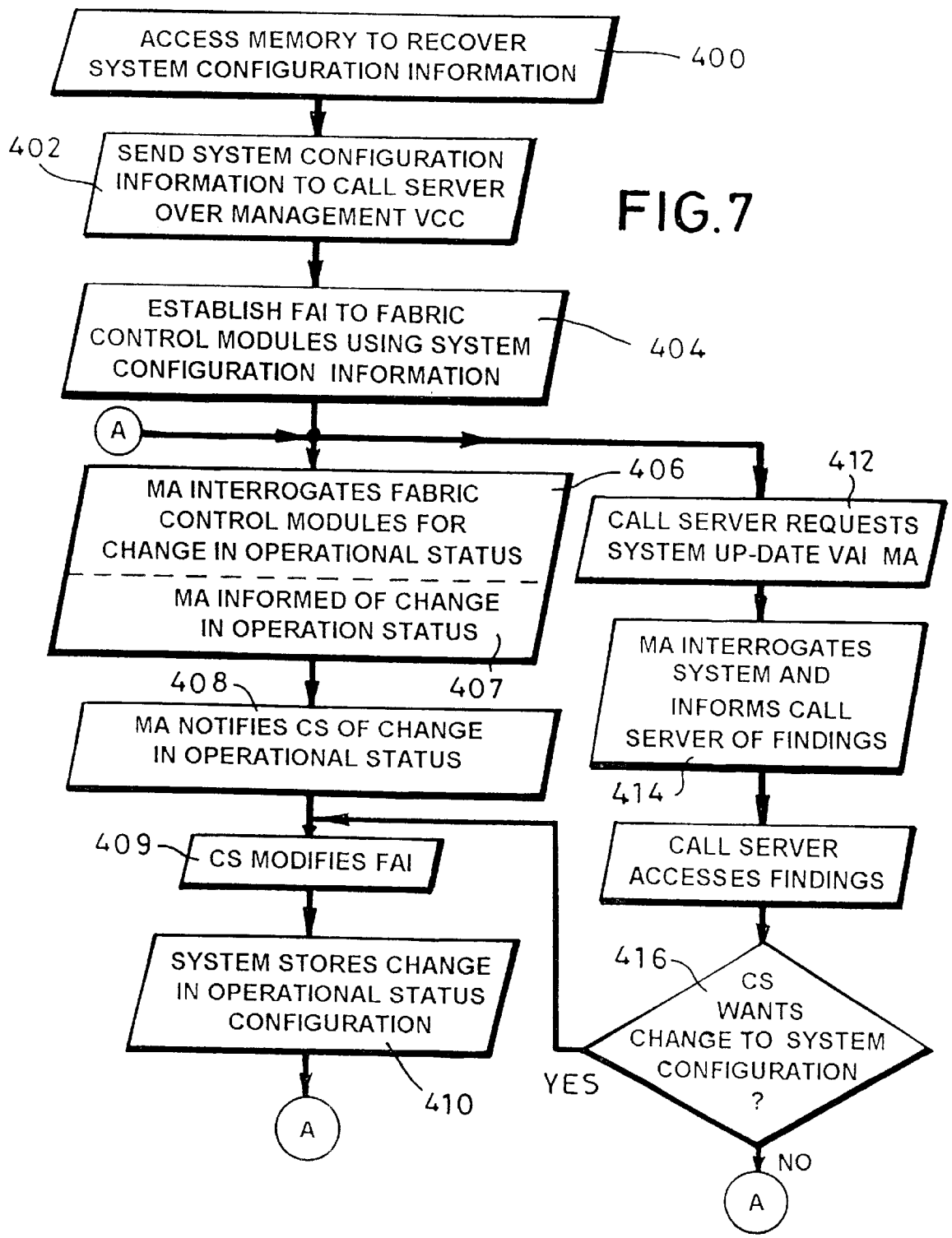
FIG. 7 is a flow diagram of a preferred operating method of the present invention.

The basic operating procedure for the numerous aspects of the present invention is summarised in the flow diagram of FIG. 7. At step 400, initial system configuration information (pertaining to a basic network architecture of, for example, a new narrowband-broadband interface) is stored in the memory of the management agent and then subsequently accessed by the management processor. At 402, the management processor sends the initial system configuration information to the call server via the management VCC. An FAI 306 is established by the call server (based on the received system configuration information), which FAI allows system optimised communication to each on-line fabric control module (at step 404).

In the event that the system is altered (steps 406–407) by the addition of new equipment, the bringing on-line of new or repaired equipment, or the failure of a fabric control module or circuit controlled thereby, the management agent notifies (step 408) the call server of the change in operational status and hence prompts the call server into modifying the FAI (step 409). More specifically, in relation to steps 406–407 that may be alternatives or complementary, the management agent either interrogates the fabric control modules (typically on a periodic basis) to determine system configuration changes or is informed of operational changes by unsolicited reports from the fabric control modules. The system, generally, is then able to record (step 410) the changes in its operation state, with this information possibly used to trigger a subsequent polling (step 406) of a fabric control modules by the management agent. Typically, system operation will then loop back to steps 406–407.

After step 404, the system of the present invention may also take another path different to that described immediately above; specifically, the call server may require a system up-date. In curtain circumstances, as will be appreciated, the call server does not have direct access to system configuration information, e.g. the call server is unlikely to be aware of the status of a circuit that is not in use. Therefore, the call server 302 requests a status report or system up-date (step 412) through the issuance of a STATUS ENQUIRY to the management agent 338. As such, the management agent acts as a conduit for the call server and therefore interrogates the various system entities (or the ATMS 304, in general) and circuits on behalf of the call server 302 before reporting its findings (step 414) on system configuration to the call server. The call server 302 is then able to access the findings in the report (step 415) before being able to arrive at a decision (step 416), based on the findings, on whether a change in system configuration is warranted (step 416). In the event that the call server 302 deems it necessary to alter the system configuration (e.g. to optimise system performance), then the flow proceeds to step 409. If no change is required (i.e. the present system configuration is acceptable or the findings by the management agent are as anticipated by the call server), then the process loops back to step 406.

Steps 406 to 416 (inclusive) may be worked independently of the initial FAI set-up procedure, and could therefore be easily applied to present systems.

In summary, therefore, the architecture of the preferred embodiment of the present invention ensures that a unified view is always presented to the call server 302 through the FAI, which unified view is established through communication over a known management circuit between the call server and the management agent 338. Then, in an operational situation, the preferred operating mechanism of the present invention allows the control processor 309 of the call server 302 to instigate changes in connection status through the connection broker and system configuration through the management agent 338. Additionally or alternatively, a call server can request information pertaining to the status of the circuits and equipment within the narrowband-broadband interface (i.e. the ATMS 304) through the management agent, since the management agent 338 is arranged to interrogate the modules of the fabric control system 344. Furthermore, the management agent 338 is able to advise the call server 302, on an independent basis and without a prompt from the call server 302, as to the status of this system, generally. All such messaging is based on a modified usage of the Q.2931 messaging protocol and is relayed to the call server 302 through the dedicated management VCC 342.

The management agent 338 of the present invention can also be used to support other management functions within the system. Specifically, since the management agent 338 collates information pertaining to the fabric control system, the management agent can be exploited to provide a more system-wide management function offering interfacing to surrounding operational environments (other than just the FAI 306), e.g. in relation to an ITU-T Q3 interface.

In this way, the present invention advantageously maintains a common FAI 306, while allowing the ATMS 304 to be developed and modified. For example, the management agent 338 can instruct the terminal process controllers 332 to make available trunk circuits incident to the network adaptors 46 for purposes other than relaying traffic between the narrowband network and the broadband ATM 314. Indeed, the present invention further allows the distribution of infrastructure components across a network, while maintaining such a telecommunications network as standards compliant.

It will, of course, be appreciated that the above description has been given by way of example only and that modification in detail may be made within the scope of the present invention. For example, while the preferred embodiment of the present invention advocates the use of a modified Q.2931-based signalling protocol, the underlying concepts of the present invention clearly envisage the use of other signalling schemes and the modification of primitives (and their associated data fields to support control and management).

What is claimed is:

1. A communication network comprising:
    a call server for administering, in use, operational control of connections in the communication network;
    a fabric control system comprising a plurality of fabric control modules coupled to the call server through a fabric application interface, the fabric control modules being arranged to control circuit connections within the communication network in response to the call server; and
    a management agent coupled to the call server through a dedicated management interface, the management agent including a memory for storing network configuration information for establishing fabric interface connections, the management agent further having means arranged to provide the network configuration information to the call server over the dedicated management interface to effect establishment of a uniform fabric application interface by the call server.

2. The communication network of claim 1, wherein the network configuration information includes information relating to at least one of:
    interface protocols of the fabric application interface;
    virtual circuit addresses used in the fabric application interface;
    port addresses of fabric control modules;
    types of fabric control models used in the communication network; and numbers of fabric control models used in the communication network.

3. The communication network of claim 2, wherein at least some of the plurality of fabric control modules are co-located with one another.

4. The communication network of claim 2, wherein the plurality of fabric control modules are distributed across the network.

5. The communication network of claim 1, wherein the plurality of fabric control modules are located in a fabric control system of a broadband-narrowband interface.

6. The communication network of claim 5, wherein the broadband-narrowband interface interfaces to an ATM network.

7. The communication network of claim 2, wherein the plurality of fabric control modules include at least some of:
    connection broker instances;
    signalling processor instances;
    terminal process controllers;
    switch connection circuit instances; and
    service circuit resource manager instances.

8. The communication network of claim 1, wherein the dedicated management interface is a permanent connection having a circuit identity known to both the call server and the management agent.

9. The communication network of claim 8, wherein the dedicated management interface forms part of the fabric application interface.

10. The communication network of claim 2, wherein the network configuration information is critical to the establishment of the fabric application interface.

11. The communication network of claim 1, wherein the memory is programmable to receive revised network configuration information and the means arranged to provide the network configuration information is further operational to provide the revised network configuration information to the call server after establishment of an initial fabric application interface.

12. The communication network of claim 1, wherein the plurality of fabric control modules each include a processor arranged to determine and report an operational status of its fabric control module.

13. The communication network of claim 12, wherein the management agent further comprises a management processor, and each processor in each fabric control module is capable of reporting the operational status to the management processor of the management agent.

14. The communication network of claim 13, wherein the management processor of the management agent is coupled to the dedicated management interface and arranged to notify the call server of the operational status of each fabric control module.

15. The communication network of claim 13, wherein the management processor is arranged independently to interrogate each processor in each fabric control module and to report the operational status of each fabric control module to the call server over the dedicated management interface.

16. The communication network of claim 15, wherein the dedicated management interface supports a modified Q.2931-based signalling protocol.

17. The communication network of claim 15, wherein the management processor is arranged only to report changes in the operational status of fabric control modules.

18. A method of establishing a fabric application interface between a call server arranged to administer, in use, operational control of connections in a communication system and a fabric control system comprising a plurality of fabric control modules coupled to the call server through the fabric application interface, the fabric control modules being arranged to control circuit connections within the communication system in response to the call server, the communication system further having a management agent coupled to the call server through a dedicated management interface and wherein the management agent includes a memory, the method comprising the steps of:
    storing system configuration information for establishing fabric interface connections in the memory of the management agent;

sending the system configuration information to the call server over the dedicated management interface; and establishing a uniform fabric application interface by the call server between the call server and the plurality of fabric control modules based upon receipt of the system configuration information by the call server.

19. The method of establishing a fabric application interface as claimed in claim 18, further comprising the steps of:

at the call server and in response to receiving the system configuration information, setting up at least one of the following:

interface protocols of the fabric application interface;

virtual circuit addresses used over the fabric application interface;

port addresses used by at least some of the plurality of fabric control modules;

records concerning types of fabric control models used in the communication system; and records concerning numbers of fabric control models used in the communication system.

20. The method of claim 18, further including the step of altering the fabric application interface by the steps of:

having the management agent notify the call server, over the dedicated management interface, of a system change that effects at least one fabric control module; and having the call server alter the fabric application interface based on the system changes notified via the management agent.

21. The method of claim 20, further including the step of up-dating the memory with system changes that alter system operation.

22. The method of claim 21, further comprising the step of having the management agent interrogate at least some of the fabric control modules to determine an operational status thereof.

23. The method of claim 22, wherein the step of having the management agent interrogate is responsive to a step of receiving an instruction from the call server.

24. The method of claim 22, wherein the step of having the management agent interrogate is independently actioned by the management agent.

25. A method of altering a fabric control interface between a call server arranged to administer, in use, operational control of connections in a communication network and a fabric control system comprising a plurality of fabric control modules coupled to the call server through the fabric application interface, the fabric control modules being arranged to control circuit connections within the communication network in response to the call server, the communication network further having a management agent including a memory for storing network configuration information for establishing fabric interface connections, said management agent being coupled to the call server through a dedicated management interface, the method comprising the steps of:

having the management agent notify the call server, over the dedicated management interface, of a system change that effects at least one fabric control module; and having the call server alter the fabric application interface based on the system changes notified by the management agent so as to effect establishment of a uniform fabric application interface by the call server.

26. The method of altering the fabric control interface as claimed in claim 25, wherein the management agent includes an interconnected memory for storing system configuration information and the method further comprises the step of:

up-dating the memory with system changes that alter system operation.

27. The method of altering the fabric control interface as claimed in claim 25, further comprising the step of:

having the management agent interrogate at least some of the fabric control modules to determine an operational status thereof.

28. The method of altering the fabric control interface as claimed in claim 27, wherein the step of having the management agent interrogate is responsive to a step of receiving an instruction from the call server.

29. The method of altering the fabric control interface as claimed in claim 27, wherein the step of having the management agent interrogate is independently actioned by the management agent.

30. A management agent for a communication system comprising a call server arranged to administer, in use, operational control of connections in the communication system, and a fabric control system comprising a plurality of fabric control modules coupled to the call server through a fabric application interface, the fabric control modules being arranged to control circuit connections within the communication system in response to the call server, the management agent containing:

a memory that contains system configuration information critical to the establishment of a uniform fabric application interface by the call server between the call server and the plurality of fabric control modules; and a processor coupled to the memory and arranged to send the system configuration information to the call server over a dedicated management interface to cause establishment of the fabric application interface by the call server.

31. The management agent of claim 30, wherein the memory stores at least one of the following:

interface protocols of the fabric application interface;

virtual circuit addresses used over the fabric application interface;

port addresses used by at least some of the plurality of fabric control modules;

records pertaining to types of fabric control models used in the communication system; and records pertaining to numbers of fabric control models used in the communication system.

32. The management agent of claim 30, wherein the processor is arranged to interrogate at least some of the plurality of fabric control modules to determine an operation status thereof and wherein the processor is further arranged to notify the call server, over the dedicated management interface, of a change in operational status that effects at least one fabric control module to instigate alteration of the fabric application interface in response to and based on the change.

33. The management agent of claim 32, wherein the processor up-dates the memory with change in operational status.

34. The management agent of claim 32, wherein the processor interrogates at least some of the plurality of fabric control modules in response to a receiving an instruction from the call server.

35. The management agent of claim 32, wherein the processor interrogates at least some of the plurality of fabric control modules on an independent basis.

36. A method of interrogating communication system entities operationally responsive to a call server arranged to administer, in use, operational control of connections in a communication network, the call server and at least some of the communication system entities coupled to a management agent being arranged to interrogate the at least some of the communication system entities, the method comprising the steps of:

sending a status request message to the management agent from the call server;

in response to receiving the status request message at the call server, having the management agent interrogate at least one of the at least some of the communication system entities to determine an operational status thereof; and having the management agent communicate the operational status to the call server so as to effect establishment of a uniform fabric application interface by the call server.

37. The method of interrogating communication system entities as claimed in claim 36, further comprising the step of:

in response to receiving the operational status, having the call server change a configuration of the communication network.

38. The method of interrogating communication system entities as claimed in claim 37, wherein the management agent is coupled to the call server over a dedicated management interface.

39. The method of interrogating communication system entities as claimed in claim 38, wherein the communication system entities include a plurality of fabric control modules.

40. The method of interrogating communication system entities as claimed in claim 38, wherein the communication system entities include circuits of the communication network.

41. The method of interrogating communication system entities as claimed in claim 40, wherein the step of interrogating includes the step of interrogating circuits not currently inactive in a call.

42. The method of interrogating communication system entities as claimed in claim 36, wherein the call server is coupled to the communication system entities through a fabric application interface and wherein the communication system entities are arranged to control circuit connections within the communication network in response to the call server, the management agent having both a memory that contains system configuration information critical to the establishment of the fabric application interface between the call server and the plurality of fabric control modules and a processor coupled to the memory, the method further comprising the step of:

prior to the step of interrogating, sending the system configuration information to the call server over the dedicated management interface to cause establishment of the fabric application interface.

43. The method of interrogating communication system entities as claimed in claim 42, the method further including the step of having the call server periodically request a status up-date from the management agent.

* * * * *